US012706633B2

(12) United States Patent
Guo et al.

(10) Patent No.: US 12,706,633 B2
(45) Date of Patent: Aug. 11, 2026

(54) WIRELESS COMMUNICATION DEVICE AND METHOD THAT UTILIZE SPREAD SPECTRUM MODULATION TO HIDE VENDOR INFORMATION

(71) Applicant: REALTEK SEMICONDUCTOR CORPORATION, Hsinchu (TW)

(72) Inventors: Ming-Zhi Guo, Suzhou (CN); Zuo-Hui Peng, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 654 days.

(21) Appl. No.: 18/152,177

(22) Filed: Jan. 10, 2023

(65) Prior Publication Data

US 2023/0223982 A1 Jul. 13, 2023

(30) Foreign Application Priority Data

Jan. 12, 2022 (CN) ......................... 202210031816.5

(51) Int. Cl.
*H04B 1/707* (2011.01)
*H04B 1/7073* (2011.01)

(52) U.S. Cl.
CPC ......... *H04B 1/707* (2013.01); *H04B 1/70735* (2013.01)

(58) Field of Classification Search
CPC ...... H04B 1/707; H04B 1/70735; H04B 1/38; G06F 21/602; G06F 15/16; G06K 9/00013; H04L 65/403; H04L 9/00; H04Q 7/24
See application file for complete search history.

(56) References Cited

U.S. PATENT DOCUMENTS

2010/0029325 A1* 2/2010 Wang ................ H04W 72/1215 455/553.1
2018/0314841 A1* 11/2018 Ching ................ G06V 40/1365
2020/0274782 A1* 8/2020 Balaiah ................... H04L 67/51

* cited by examiner

*Primary Examiner* — Iqbal Zaidi
(74) *Attorney, Agent, or Firm* — WPAT. PC

(57) ABSTRACT

A wireless communication method includes: modulating, by a device, a string a string to be transmitted in a physical layer according to a spread spectrum sequence (SSS) code corresponding to a vendor of the device when the string is a specific data string of a packet; demodulating, by another device, the packet according to a first SSS code corresponding to a predetermined communication protocol; determining a detection value according to the specific data string and the first SSS code and another detection value according to the specific data string and a SSS code corresponding to a predetermined vendor, and determining whether both vendors of those devices are the predetermined vendor according to those detection values; and if both vendors of those devices are the predetermined vendor, performing, by the another device, a specific communication mode of the predetermined vendor to be connected with the device.

15 Claims, 6 Drawing Sheets

WIRELESS COMMUNICATION DEVICE AND METHOD THAT UTILIZE SPREAD SPECTRUM MODULATION TO HIDE VENDOR INFORMATION

BACKGROUND OF THE INVENTION

1. Field of the Invention

The present disclosure relates to a wireless communication system, especially to a wireless communication device and a wireless communication method that are able to utilize spread spectrum modulation to hide vendor information in a packet.

2. Description of Related Art

In general, a wireless communication device is connected to other wireless communication devices via a predetermined communication protocol. In the existing predetermined communication protocol, two devices are required to exchange device information via certain hand-shaking procedures and make the connection in a connection mode defined by the predetermined communication protocol after the device information is verified, in which that device information is typically set in the frame of a media access control (MAC) layer of the packet. In order to improve stability, these devices are usually connected via a common communication protocol, without considering the specificities and application requirements of different devices. For example, some communication devices may have high power saving requirements. If those devices are connected to other devices using a common protocol (rather than a relatively power-efficient protocol), those devices may not be able to fully meet the power-saving requirements.

SUMMARY OF THE INVENTION

In some aspects, an object of the present disclosure is, but is not limited to, to provide a wireless communication device and a wireless communication method that are able to utilize a spread spectrum modulation to hide vendor information.

In some aspects, a wireless communication device includes a transceiver circuit and a processor circuit. The transceiver circuit is configured to receive a packet from an electronic device and demodulate the packet according to a spread spectrum sequence code corresponding to a predetermined communication protocol, in order to obtain in a physical layer a specific data string of the packet. The processor circuit is configured to determine a first detection value according to the specific data string and the spread spectrum sequence code corresponding to the predetermined communication protocol, determine a second detection value according to the specific data string and a spread spectrum sequence code corresponding to a predetermined vendor, and determine whether a vendor of the electronic device is the predetermined vendor according to the first detection value and the second detection value. If the processor circuit determines that the vendor of the electronic device is the predetermined vendor, the processor circuit is further configured to perform a specific communication mode of the predetermined vendor to connect to the electronic device, and if the processor circuit determines that the vendor of the electronic device is not the predetermined vendor, the processor circuit is further configured to perform a predetermined communication mode of the predetermined communication protocol to connect to the electronic device.

In some aspects, a wireless communication device includes a processor circuit and a transceiver circuit. The transceiver circuit is configured to determine whether a string to be transmitted in a physical layer is a specific data string of a packet, modulate the string according to a spread spectrum sequence code corresponding to a first vendor when the string is the specific data string, and transmit the packet to an electronic device such that the electronic device determines whether the first vendor is a predetermined vendor. If the electronic device determines that the first vendor is the predetermined vendor, the processor circuit is further configured to perform a specific communication mode of the predetermined vendor to connect to the electronic device, and if the electronic device determines that the first vendor is not the predetermined vendor, the processor circuit is further configured to perform a predetermined communication mode of a predetermined communication protocol to connect to the electronic device.

In some aspects, a wireless communication method includes the following operations: determining, by a first wireless communication device, whether a string to be transmitted in a physical layer is a specific data string of a packet, and modulating the string according to a spread spectrum sequence code corresponding to a vendor of the first wireless communication device when the string is the specific data string; transmitting, by the first wireless communication device, the packet to a second wireless communication device; demodulating, by the second wireless communication device, the packet according to a spread spectrum sequence code corresponding to a predetermined communication protocol to obtain the specific data string; determining, by the second wireless communication device, a first detection value according to the specific data string and the spread spectrum sequence code corresponding to the predetermined communication protocol and a second detection value according to the specific data string and a spread spectrum sequence code corresponding to a predetermined vendor, and determining, by the second wireless communication device, whether both of the vendor of the first wireless communication device and a vendor of the second wireless communication device are the predetermined vendor; if both of the vendor of the first wireless communication device and the vendor of the second wireless communication are the predetermined vendor, performing, by the second wireless communication device, a specific communication mode of the predetermined vendor to connect to the first wireless communication device; and if at least one of the vendor of the first wireless communication device and the vendor of the second wireless communication device is not the predetermined vendor, performing, by the second wireless communication device, a predetermined communication mode of the predetermined communication protocol to connect to the first wireless communication device.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

In this document, the term "coupled" may also be termed as "electrically coupled," and the term "connected" may be termed as "electrically connected." "Coupled" and "connected" may mean "directly coupled" and "directly connected" respectively, or "indirectly coupled" and "indirectly connected" respectively. "Coupled" and "connected" may also be used to indicate that two or more elements cooperate or interact with each other. In this document, the term "circuitry" may indicate a system formed with one or more circuits, and the term "circuit" may indicate an object, which is formed with one or more transistors and/or one or more active/passive elements based on a specific arrangement, for processing signals.

As used herein, the term "and/or" includes any and all combinations of one or more of the associated listed items. Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. For ease of understanding, like elements in various figures are designated with the same reference number.

Figure 1:
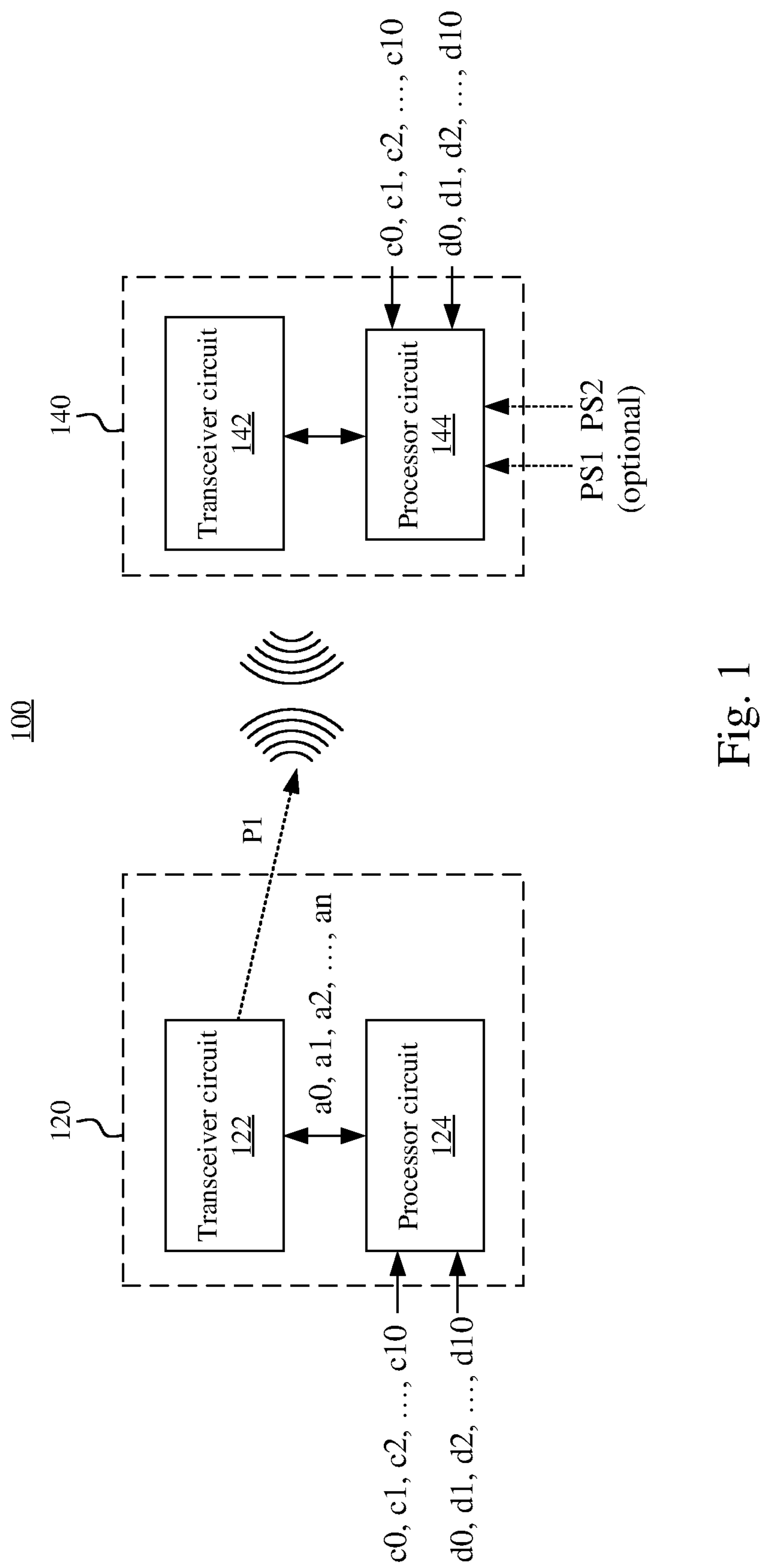
FIG. 1 illustrates a schematic diagram of a wireless communication system according to some embodiments of the present disclosure.

FIG. 1 illustrates a schematic diagram of a wireless communication system 100 according to some embodiments of the present disclosure. The wireless communication system 100 includes a wireless communication device 120 and a wireless communication device 140. In some embodiments, each of the wireless communication device 120 and the wireless communication device 140 may be an electronic device having a wireless communication ability, and the wireless communication device 120 and the wireless communication device 140 may exchange data and/or command(s) with each other via wireless communication. For example, the wireless communication device 120 may be, but not limited to, a wireless access point, and the wireless communication device 140 may, but not limited to, operate as a station.

The wireless communication device 120 includes a transceiver circuit 122 and a processor circuit 124. The transceiver circuit 122 may be configured to transfer data (e.g., packet P1) and/or command(s) to the wireless communication device 140 or receive data and/or command(s) from the wireless communication device 140. In some embodiments, the transceiver circuit 122 may be a transceiver circuit that supports a predetermined communication protocol. In some embodiments, the predetermined communication protocol may be, but not limited to, IEEE 802.11 or its related communication standard. In some embodiments, the transceiver circuit 122 may utilize a spread spectrum technique to modulate data to be transmitted and output the modulated data to be the packet P1. For example, the transceiver circuit 122 may utilize a direct sequence spread spectrum (DSSS) technique to modulate data to be transmitted (e.g., string a0, a1, a2, . . . , an) to generate the packet P1. The processor circuit 124 may be configured to perform operations in FIG. 2A, in order to connect to the wireless communication device 140. In some embodiments, the processor circuit 124 may be, but not limited to, a digital signal processor circuit in a baseband circuitry of the wireless communication device 120.

Similar to the wireless communication device 120, the wireless communication device 140 includes a transceiver circuit 142 and a processor circuit 144. The transceiver circuit 142 may be configured to transmit data and/or command(s) to the wireless communication device 120 or receive data (e.g., packet P1) and/or command(s) from the wireless communication device 120. In some embodiments, the transceiver circuit 142 is a transceiver circuit that supports the predetermined communication protocol. In some embodiments, the transceiver circuit 142 may utilize the spread spectrum modulation technique to demodulate the packet P1 to obtain data in the packet P1. For example, the transceiver circuit 142 may utilize the DSSS technique to demodulate the packet P1. The processor circuit 144 may be configured to perform operations in FIG. 2B, in order to connect to the wireless communication device 120. In some embodiments, the processor circuit 144 may be, but not limited to, a digital signal processor circuit in a baseband circuitry of the wireless communication device 140.

In some embodiments, the wireless communication device 120 and the wireless communication device 140 may be electronic devices that are fabricated by the same vendor. In general cases, the wireless communication device 120 (and/or the wireless communication device 140) is connected to other electronic devices via a predetermined communication mode defined in a predetermined communication protocol. With operations in FIG. 2A and FIG. 2B, the wireless communication device 140 may determine whether the vendor of the wireless communication device 120 (hereinafter referred to as "first vendor") is the same as the vendor of the wireless communication device 140 (hereinafter referred to as "predetermined vendor") based on the packet P1 from the wireless communication device 120. If the wireless communication device 140 detects that the first vendor is the predetermined vendor, it indicates that the vendor of the wireless communication device 120 is the same as that of the wireless communication device 140. Under this condition, the wireless communication device 120 and the wireless communication device 140 may perform a specific communication mode or a specific function predefined by the predetermined vendor, in order to speed up the communication or meet special needs. For example, if the wireless communication device 120 have a power-saving requirement, the wireless communication device 120 and the wireless communication device 140 may be connected to each other via a relatively power-saving communication mode.

In some embodiments, the specific communication mode may be an improved connection mode based on the predetermined communication protocol, which may utilize specific information stored in advance to save time for exchange information and verification, in order to improve the connection efficiency. In some embodiments, the specific communication mode may be an improved connection mode based on the predetermined communication protocol, which may utilize band(s) with low interoperability in the predetermined communication protocol to establish the connection to improve the connection efficiency. For example, generally speaking, communications devices operating in the 5G band do not use the band corresponding to 802.11b for data exchange. If the wireless communication device 120 and the wireless communication device 140 are operating in the 5G band, the wireless communication device 120 and the wireless communication device 140 may utilize the band corresponding to 802.11b to transmit packet(s) via the specific connection mode on condition that the vendor of the wireless communication device 120 is the same as that of the wireless communication device 140. In some embodiments, the specific communication mode may be a connection mode obtained by adjusting upper rule(s) of the predetermined communication protocol.

The types of the specific communication mode are given for illustrative purposes, and the present disclosure is not limited thereto. In some embodiments, the specific information may be device data, product serial number, communication characteristic(s), and so on of the wireless communication device 120 (and/or the wireless communication device 140). For example, the wireless communication device 140 may include a memory circuit (not shown), which may store the specific information about the wireless communication device 120 in advance. Similarly, the wireless communication device 120 may include a memory circuit (not shown), which may store the specific information about the wireless communication device 140 in advance.

Alternatively, if the wireless communication device 140 detects that the first vendor is not the predetermined vendor, it indicates that the vendor of the wireless communication device 120 is different from that of the wireless communication device 140. Under this condition, the wireless communication device 120 and the wireless communication device 140 may be connected to each other via the predetermined communication mode in the predetermined communication protocol.

Figure 2A:
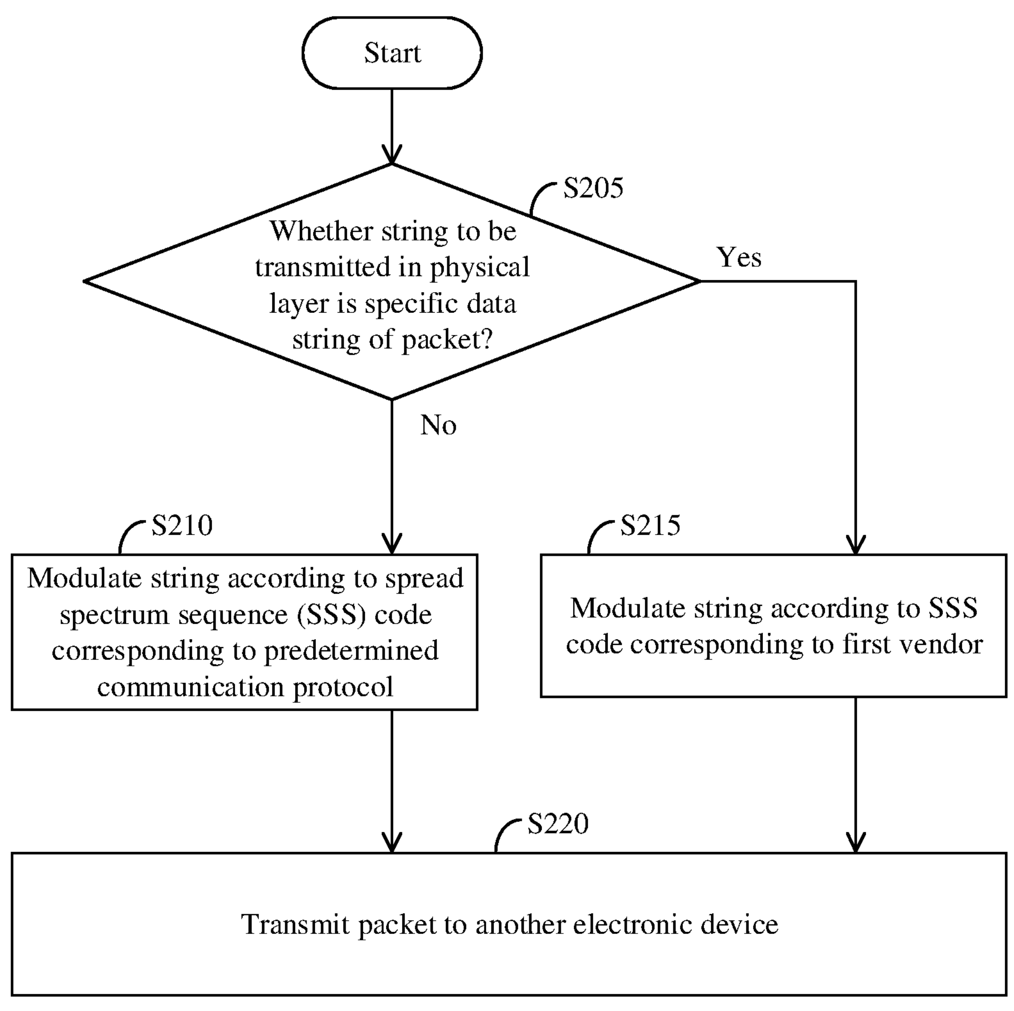
FIG. 2A illustrates a flow chart of operations performed by the wireless communication device in FIG. 1 according to some embodiments of the present disclosure.

FIG. 2A illustrates a flow chart of operations performed by the wireless communication device 120 in FIG. 1 according to some embodiments of the present disclosure. In this example, the wireless communication device 120 operates a transmitter end. In operation S205, whether a string to be transmitted in a physical layer is a specific data string of a packet is determined. If the string is not the specific data string, operation S210 is performed. Alternatively, if the string is the specific data string, operation S215 is performed. In operation S210, the string is modulated according to a spread spectrum sequence (SSS) code corresponding to the predetermined communication protocol. In operation S215, the string is modulated according to a SSS code corresponding to the first vendor. In operation S220, the packet is transmitted to another electronic device (e.g., the wireless communication device 140).

Taking the predetermined communication protocol being IEEE 802.11b as an example, the transceiver circuit 122 may perform a DSSS modulation on the string to be transmitted to generate a modulated string and perform a differential binary phase shift keying (DBPSK) modulation on the modulated string to output the packet P1. Taking FIG. 1 as an example, if the transceiver circuit 122 determines in the physical layer that the string to be transmitted (labeled as a0, a1, a2, . . . , an) is not the specific data string of the packet P1, the transceiver circuit 122 may utilize the SSS code corresponding to the predetermined communication protocol (labeled as c0, c1, c2, . . . , c10; hereinafter referred to as "first SSS code") to perform the modulation to generate the modulated string (e.g., a0×c0, a0×c1, a0×c2, . . . , a0×c10, an×c10). Alternatively, if the transceiver circuit 122 determines that the string to be transmitted is the specific data string of the packet P1, the transceiver circuit 122 may utilize the SSS code corresponding to the predetermined vendor (labeled as d0, d1, d2, . . . , d10; hereinafter referred to as "second SSS code") to perform the modulation, in order to generate another modulated string (e.g., a0×d0, a0×d1, a0×d2, . . . , a0×d10, . . . , an×d10). Afterwards, the transceiver circuit 122 may output the modulated string to be the packet P1 and transmit the packet P1 to the wireless communication device 140. The length of the first SSS code and that of the second SSS code shown in FIG. 1 are given for illustrative purposes, and the present disclosure is not limited thereto. Various lengths of the above SSS code(s) are within the contemplated scope of the present disclosure.

In some embodiments, the first SSS code may be, but not limited to, a pseudo random bit sequence, and the second SSS code may be a bit sequence having a specific signal pattern, in which the specific signal pattern is to indicate identity information of the predetermined vendor. In some embodiments, the processor circuit 124 may adjust the first SSS code by adding the specific signal pattern, in order to generate the second SSS code. Equivalently, the processor circuit 124 deliberately adds a fixed error code (i.e., specific signal pattern) to the original first SSS code to generate the second SSS code. In examples of FIG. 1, the transceiver circuit 122 receives the first SSS code and the second SSS code via the processor circuit 124, but the present disclosure is not limited thereto. In other embodiments, the transceiver circuit 122 may receive the first SSS code and the second SSS code via other circuits or directly receive the first SSS code and the second SSS code.

In order to reduce the impact on data delivery and improve security (confidentiality), the specific data string may be, but not limited to, a string (or a data segment) for packet detection. In some embodiments, the specific data string may be at least one string in a preamble of physical layer convergence procedure (PLCP) header of the packet P1. The processor circuit 124 may determine whether the string to be transmitted is the specific data string according to a predetermined data format of the at least one string in the preamble. For example, the specific data string may be a synchronization (SYNC) code (e.g., SYNC field) or a start of frame delimiter (SFD) in the preamble. Taking the SFD as an example, as the SFD in IEEE 802.11b has 16 bits and each bit may be expressed by multiple chips, the SFD may have higher redundancy. Accordingly, if an error (e.g., the specific signal pattern) exists in the SFD, no excessive impacts will be on data transmission. With the above operations, the wireless communication device 120 may hide identity information of the vendor of the wireless communication device 120 to the specific data string of the packet P1. In some embodiments, in order to avoid excessive impacts on data transmission, the similarity between the first SSS code and the second SSS code is not lower than 80%.

The types of the specific data string are given for illustrative purposes, and the present disclosure is not limited thereto. It should be understood that, according to the different predetermined communication protocols, the specific data string can be adjusted correspondingly. The content of the PLCP header, the preamble, SYNC, and SFD can be understood with reference to the current communication standard, and thus the detailed descriptions will not be given.

Figure 2B:
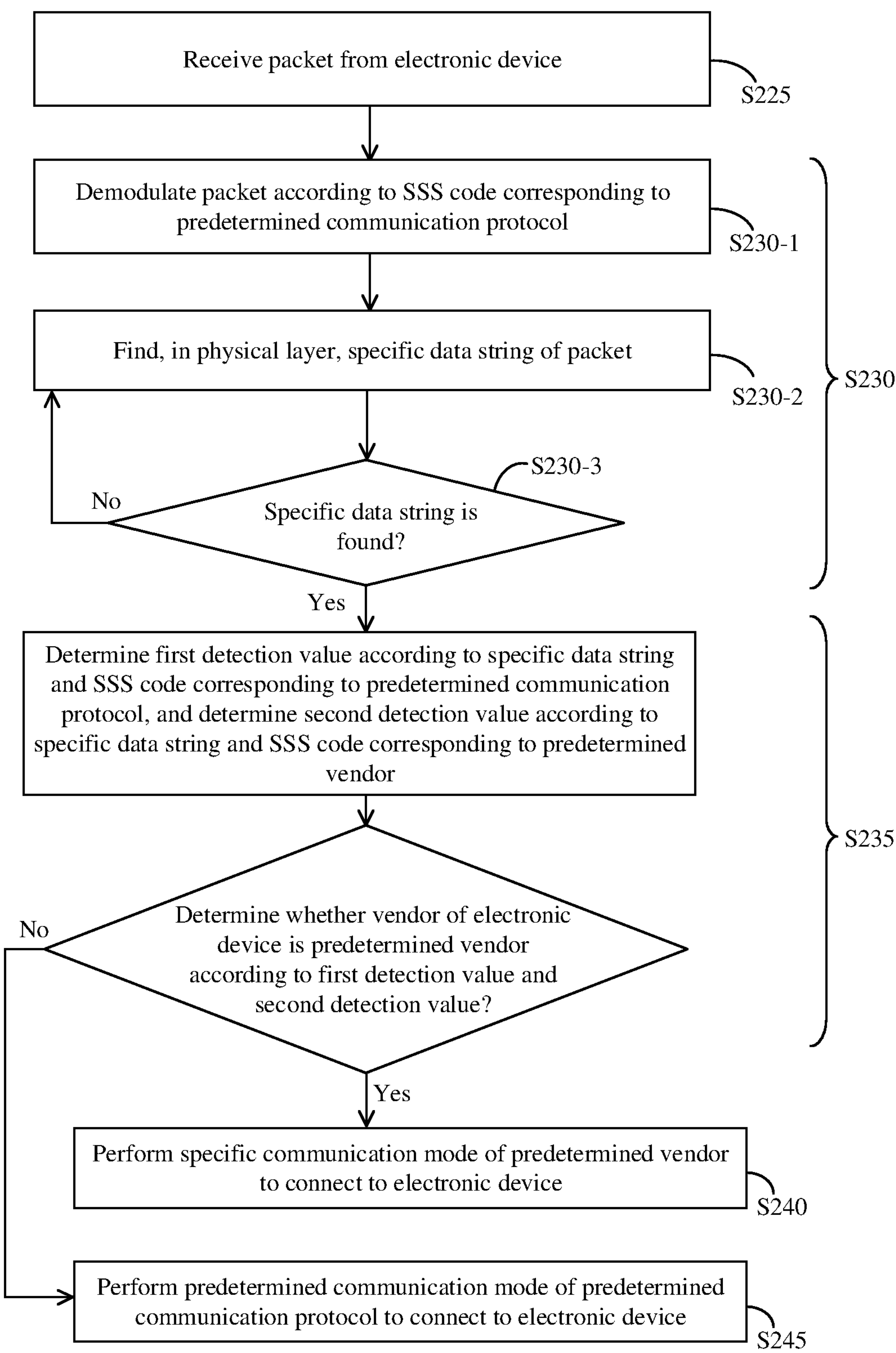
FIG. 2B illustrates a flow chart of operations performed by the wireless communication device according to some embodiments of the present disclosure.

FIG. 2B illustrates a flow chart of operations performed by the wireless communication device 140 according to some embodiments of the present disclosure. In this example, the wireless communication device 140 may operate as a receiver end, which may receive the packet P1 from the wireless communication device 120.

In operation S225, the packet (e.g., packet P1) is received from an electronic device (e.g., the wireless communication device 120). In operation S230, the packet is demodulated according to a SSS code corresponding to the predetermined communication protocol (e.g., the first SSS code) to obtain in the physical layer a specific data string (which may be, for example but not limited to, SFD) of the packet. In operation S235, a first detection value is determined according to the specific data string and the SSS code corresponding to the predetermined communication protocol (e.g., the first SSS code), a second detection value is determined according to the specific data string and the SSS code corresponding to the predetermined vendor (e.g., the second SSS code), and whether the vendor the electronic device is the predetermined vendor according to the first detection value and the second detection value. If the vendor of electronic device is the predetermined vendor, operation S240 is performed. Alternatively, if the vendor of the electronic device is not the predetermined vendor, operation S245 is performed. In operation S240, the specific communication mode of the predetermined vendor is performed to connect to the electronic device. In operation S245, the predetermined communication mode of the predetermined communication protocol is performed to connect to the electronic device.

For example, the transceiver circuit 142 may receive the packet P1 from the wireless communication device 120, and utilize the first SSS code (i.e., c0, c1, c2, . . . , c10) to demodulate the packet P1 (step S230-1). The processor circuit 144 may analyze the demodulated packet P1 according to the data format (or data segment) of the packet P1, in order to find in the physical layer the specific data string of the packet P1 (step S230-2). If the specific data string is found (step S230-3), operation S235 is performed. If the specific data string is not found, step S230-2 is performed. Operation S235 will be described with reference to FIG. 2C and FIG. 2D. In examples of FIG. 1, the transceiver circuit 142 receives the first SSS code via the processor circuit 144, but the present disclosure is not limited thereto. In other embodiments, the transceiver circuit 142 may receive the first SSS code via other circuits or directly receive the first SSS code.

If both the first vendor (i.e., the vendor of the wireless communication device 120) and the vendor of the wireless communication device 140 are determined to be the predetermined vendor based on the execution result of operation S235, the processor circuit 144 may perform the specific communication mode to connect to the wireless communication device 120. For example, the processor circuit 144 may perform the specific communication mode and send a response via the transceiver circuit 142 to notify the wireless communication device 120 that the vendor of both parties is the predetermined vendor, and the processor circuit 124 may perform the specific communication mode based on the response of the wireless communication device 140. As a result, the connection between the wireless communication device 120 and the wireless communication device 140 can be established via the specific communication mode.

Alternatively, if the first vendor is determined to be different from the vendor of the wireless communication device 140 based on the execution result of operation S235, the processor circuit 144 may perform the predetermined communication mode and send a response via the transceiver circuit 142 to notify the wireless communication device 120 that the vendors of both parties are different, and the processor circuit 124 may perform the predetermined communication mode based on the response of the wireless communication device 140. As a result, the connection between the wireless communication device 120 and the wireless communication device 140 can be established via the predetermined communication mode and the predetermined communication protocol.

Figure 2C:
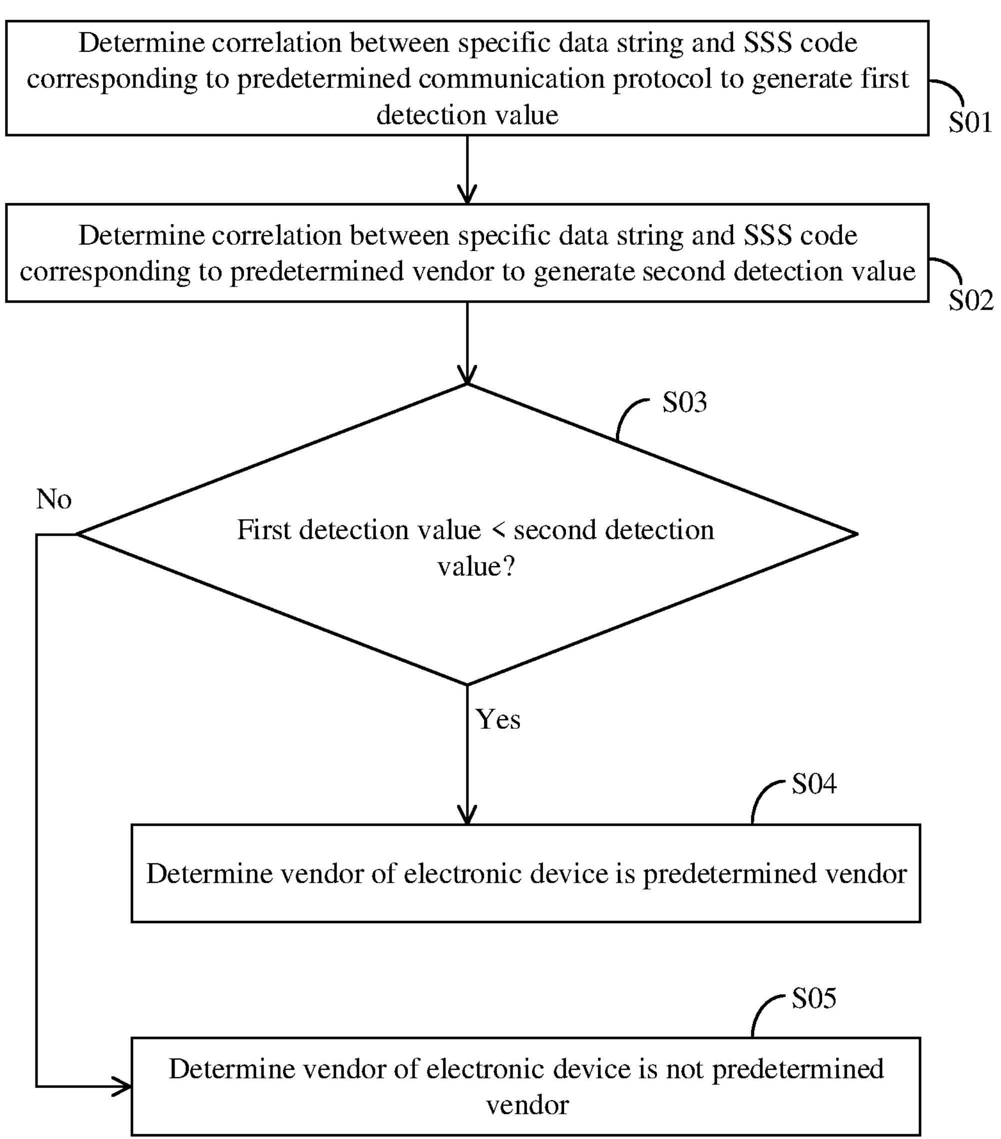
FIG. 2C illustrates a flow chart of an operation in FIG. 2B according to some embodiments of the present disclosure.

FIG. 2C illustrates a flow chart of operation S235 in FIG. 2B according to some embodiments of the present disclosure. In this example, operation S235 includes steps S01-S05. In step S01, a correlation between the specific data string and the SSS code (i.e., the first SSS code) corresponding to the predetermined communication protocol is determined to generate the first detection value. In step S02, a correction between the specific data string and the SSS code (i.e., the second SSS code) corresponding to the predetermined vendor is determined to generate the second detection value. For example, the processor circuit 144 may sequentially multiply symbols in the specific data string (which may be, but not limited to, SFD) with the first SSS code, and accumulate the multiplication results to generate the first detection value. Similarly, the processor circuit 144 may sequentially multiply the symbols in the specific data string with the second SSS code and accumulate the multiplication results to generate the second detection value.

In step S03, the first detection value is compared with the second detection value to determine whether the first detection value is lower than the second detection value. If the first detection value is lower than the second detection value, it indicates that the correlation between the received specific data string and the SSS code corresponding to the predetermined vendor (i.e., the second SSS code) is higher. In other words, there is high probability that the wireless communication device 120 utilizes the SSS code corresponding to the predetermined vendor to modulate the specific data string. Under this condition, the processor circuit 144 may determine that both of the first vendor (i.e., the vendor of the wireless communication device 120) and the vendor of the wireless communication device 140 are the predetermined vendor and perform operation S240 in FIG. 2B (step SO4). Alternatively, if the first detection value is higher than second detection value, it indicates that the correlation between the received specific data string and the SSS code corresponding to the predetermined communication protocol (i.e., the first SSS code) is higher. In other words, there is high probability that the wireless communication device 120 utilizes the SSS code corresponding to the predetermined communication protocol modulate the specific data string. Under this condition, the processor circuit 144 may determine that the first vendor is different from the vendor of the wireless communication device 140 (i.e., the first vendor is not the predetermined vendor), and operation S245 in FIG. 2B is performed (step S05).

The calculations about the correlations are given for illustrative purposes, and the present disclosure is not limited thereto. In some other embodiments, the processor circuit 144 may calculate a correlation coefficient according to the specific data string and the first SSS code to generate the first detection value and calculate a correlation coefficient according to the specific data string and the second SSS code to generate the second detection value. Various statistics indicators able to indicate the correlation between two data are able to determine the first detection value and the second detection value.

Figure 2D:
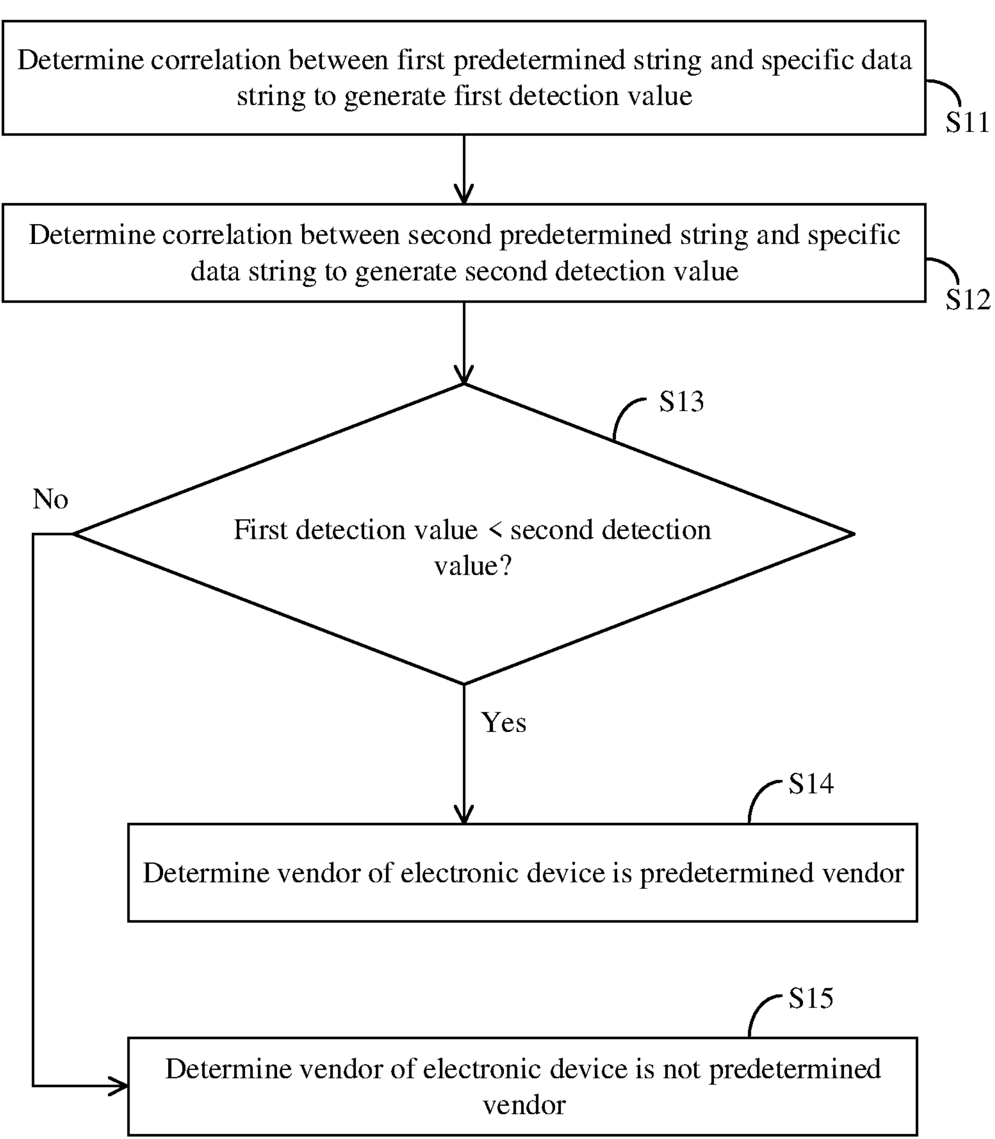
FIG. 2D illustrates a flow chart of an operation in FIG. 2B according to some embodiments of the present disclosure.

FIG. 2D illustrates a flow chart of operation S235 in FIG. 2B according to some embodiments of the present disclosure. In this example, operation S235 includes steps S11-S15. In step S11, the correlation between a first predetermined string (e.g., the predetermined string PS1 in FIG. 1) and the specific data string is determined to generate the first detection value. In step S12, the correlation between a second predetermined string (e.g., the predetermined string PS2 in FIG. 1) and the specific data string is determined to generate the second detection value. In step S13, the first detection value is compared with the second detection value to determine whether the first detection value is lower than the second detection value.

In some optional embodiments, the wireless communication device 140 further includes a memory circuit (not shown), which may be configured to store the predetermined string PS1 and the predetermined string PS2. The predetermined string PS1 may be a string generated based on the SSS code corresponding to the predetermined communication protocol (i.e., the first SSS code), and the predetermined string PS2 is a string generated based on the SSS code corresponding to the predetermined vendor (i.e., the second SSS code). For example, the predetermined string PS1 is a string generated by utilizing the predetermined SFD to modulate the first SSS code, and the predetermined string PS2 is a string generated by utilizing the predetermined SFD to modulate the second SSS code. As a result, the processor circuit 144 may utilize the predetermined string PS1 and the predetermined string PS2 to determine the first detection value and the second detection value.

For example, similar to step S01 and step S02, the processor circuit 144 may determine the correlation between the predetermined string PS1 and the specific data string to generate the first detection value and determine the correlation between the predetermined string PS2 and the specific data string to generate the second detection value. The processor circuit 144 may determine whether the first vendor is the predetermined vendor according to the comparison result of the first detection value and the second detection value. Step S13 to step S15 are the same as step 03 to step S05 in FIG. 2C, and thus the repetitious descriptions are not further given. In these optional embodiments, the processor circuit 144 may not receive the first SSS code and/or the second SSS code, but the present disclosure is not limited thereto.

Figure 3:
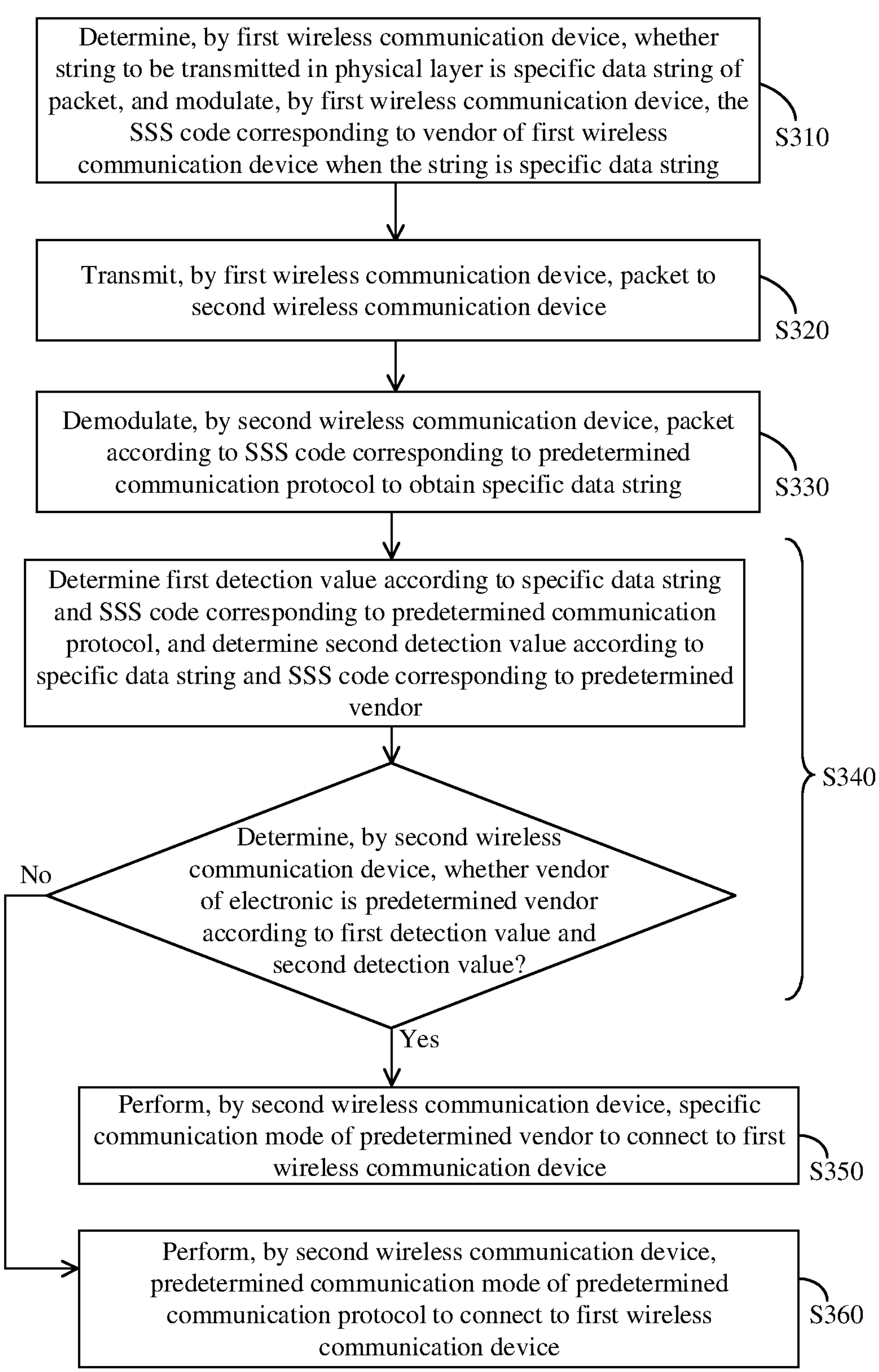
FIG. 3 illustrates a flow chart of a wireless communication method according to some embodiments of the present disclosure.

FIG. 3 illustrates a flow chart of a wireless communication method 300 according to some embodiments of the present disclosure. In some embodiments, the wireless communication method 300 may be, but not limited to, performed by the wireless communication system 100 in FIG. 1.

In operation S310, whether a string to be transmitted in a physical layer is a specific data string (e.g., at least one string in a preamble of the PLCP header) of a packet (e.g., packet P1) is determined by a first wireless communication device (e.g., the wireless communication device 120), and the string is modulated according to a spread spectrum sequence code corresponding to the vendor of the first wireless communication device (e.g., the second SSS code) when the string is the specific data string. In operation S320, the packet is transmitted by the first wireless communication device to a second wireless communication device (e.g., the wireless communication device 140). In operation S330, the packet is demodulated according to a spread spectrum sequence code corresponding to a predetermined communication protocol (e.g., the first SSS code) by the second wireless communication device, in order to obtain the specific data string. In operation S340, a first detection value is determined, by the second wireless communication device, according to the specific data string and the SSS code corresponding to the predetermined communication protocol, a second detection value is determined, by the second wireless communication device, according to the specific data string and the SSS code corresponding to the predetermined vendor (i.e., the second SSS code), and whether both of the vendor of the first wireless communication device and the vendor of the second wireless communication device are the predetermined vendor is determined, by the second wireless communication device, according to the first detection value and the second detection value. If both of the vendor of the first wireless communication device and that of the second wireless communication device are the predetermined vendor, operation S350 is performed. Alternatively, if at least one of the vendor of the first wireless communication device and that of the second wireless communication device is not the predetermined vendor, operation S360 is performed. In operation S350, a specific communication mode of the predetermined vendor is performed by the second wireless communication device, in order to connect to the first wireless communication device. In operation S360, a predetermined communication mode of the predetermined communication protocol is performed by the second wireless communication device, in order to connect to the first wireless communication device.

The operations S310, S320, S330, S340, S350, and S360 can be understood with reference the above embodiments, and thus the repetitious descriptions are not further given. The above description of FIG. 2A, FIG. 2B, FIG. 2C, FIG. 2D, and/or FIG. 3 may include exemplary operations, but the operations shown in FIG. 2A, FIG. 2B, FIG. 2C, FIG. 2D, and/or FIG. 3 are not necessarily performed in the order described above. Operations shown in FIG. 2A, FIG. 2B, FIG. 2C, FIG. 2D, and/or FIG. 3 can be added, replaced, changed order, and/or eliminated, or the operations shown in FIG. 2A, FIG. 2B, FIG. 2C, FIG. 2D, and/or FIG. 3 can be executed simultaneously or partially simultaneously as appropriate, in accordance with the spirit and scope of various embodiments of the present disclosure.

As described above, the wireless communication device and the wireless communication method in some embodiments of the present disclosure may utilize different spread spectrum sequence codes to modulate a specific data string of a packet in a physical layer, in order to hide related information of the device vendor. As a result, it is able to verify whether the vendor of the transmitter end is the same as that of the receiver end, in order to selectively perform the specific communication mode (which is different from the predetermined communication mode of the predetermined communication protocol) to improve the connection efficiency or meet the special needs.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

The aforementioned descriptions represent merely the preferred embodiments of the present disclosure, without any intention to limit the scope of the present disclosure thereto. Various equivalent changes, alterations, or modifications based on the claims of the present disclosure are all consequently viewed as being embraced by the scope of the present disclosure.

What is claimed is:

1. A wireless communication device, comprising:

a transceiver circuit configured to receive a packet from an electronic device and demodulate the packet according to a spread spectrum sequence code corresponding to a predetermined communication protocol, in order to obtain in a physical layer a specific data string of the packet; and a processor circuit configured to determine a first detection value according to the specific data string and the spread spectrum sequence code corresponding to the predetermined communication protocol, determine a second detection value according to the specific data string and a spread spectrum sequence code corresponding to a predetermined vendor, and determine whether a vendor of the electronic device is the predetermined vendor according to the first detection value and the second detection value, wherein the processor circuit is configured to perform a specific communication mode of the predetermined vendor to connect to the electronic device when the processor circuit determines that the vendor of the electronic device is the predetermined vendor, the processor circuit is configured to perform a predetermined communication mode of the predetermined communication protocol to connect to the electronic device when the processor circuit determines that the vendor of the electronic device is not the predetermined vendor, and the processor circuit is configured to determine whether the vendor of the electronic device is the predetermined vendor when the first detection value is lower than the second detection value.

2. The wireless communication device of claim 1, wherein the specific data string is at least one string in a preamble of a physical layer convergence procedure header of the packet.

3. The wireless communication device of claim 2, wherein the at least one string is a synchronization code or a start of frame delimiter.

4. The wireless communication device of claim 1, wherein the processor circuit is configured to determine a correlation between the specific data string and the spread spectrum sequence code corresponding to the predetermined communication protocol to generate the first detection value, and determine a correlation between the specific data string and the spread spectrum sequence code corresponding to the predetermined vendor to generate the second detection value.

5. The wireless communication device of claim 1, wherein the processor circuit is configured to determine a correlation between a first predetermined string and the specific data string to generate the first detection value, and determine a correlation between a second predetermined string and the specific data string to generate the second detection value, the first predetermined string is generated based on the spread spectrum sequence code corresponding to the predetermined communication protocol, and the second predetermined string is generated based on the spread spectrum sequence code corresponding to the predetermined vendor.

6. A wireless communication device, comprising:

a processor circuit; and a transceiver circuit configured to determine whether a string to be transmitted in a physical layer is a specific data string of a packet, modulate the string according to a spread spectrum sequence code corresponding to a first vendor when the string is the specific data string, and transmit the packet to an electronic device such that the electronic device determines whether the first vendor is a predetermined vendor, wherein if the electronic device determines that the first vendor is the predetermined vendor, the processor circuit is further configured to perform a specific communication mode of the predetermined vendor to connect to the electronic device when the electronic device determines that the first vendor is the predetermined vendor, if the electronic device determines that the first vendor is not the predetermined vendor, the processor circuit is further configured to perform a predetermined communication mode of a predetermined communication protocol to connect to the electronic device when the electronic device determines that the first vendor is not the predetermined vendor, and if the string to be transmitted in the physical layer is not the specific data string, the transceiver circuit is further configured to modulate the string to be transmitted in the physical layer according to a spread spectrum sequence code corresponding to the predetermined communication protocol when the string to be transmitted in the physical layer is not the specific data string.

7. The wireless communication device of claim 6, wherein the specific data string is at least one string in a preamble of a physical layer convergence procedure header of the packet.

8. The wireless communication device of claim 7, wherein the at least one string is a synchronization code or a start of frame delimiter.

9. A wireless communication method, comprising:

determining, by a first wireless communication device, whether a string to be transmitted in a physical layer is a specific data string of a packet, and modulating the string according to a spread spectrum sequence code corresponding to a vendor of the first wireless communication device when the string is the specific data string;

transmitting, by the first wireless communication device, the packet to a second wireless communication device;

demodulating, by the second wireless communication device, the packet according to a spread spectrum sequence code corresponding to a predetermined communication protocol to obtain the specific data string;

determining, by the second wireless communication device, a first detection value according to the specific data string and the spread spectrum sequence code corresponding to the predetermined communication protocol and a second detection value according to the specific data string and a spread spectrum sequence code corresponding to a predetermined vendor, and determining, by the second wireless communication device, whether both of the vendor of the first wireless communication device and a vendor of the second wireless communication device are the predetermined vendor;

if both of the vendor of the first wireless communication device and the vendor of the second wireless communication device are the predetermined vendor, performing, by the second wireless communication device, a specific communication mode of the predetermined vendor to connect to the first wireless communication device when both of the vendor of the first wireless communication device and the vendor of the second wireless communication device are the predetermined vendor; and if at least one of the vendor of the first wireless communication device and the vendor of the second wireless communication device is not the predetermined vendor, performing, by the second wireless communication device, a predetermined communication mode of the predetermined communication protocol to connect to the first wireless communication device when at least one of the vendor of the first wireless communication device and the vendor of the second wireless communication device is not the predetermined vendor.

10. The wireless communication method of claim 9, wherein determining, by the second wireless communication device, the first detection value according to the specific data string and the spread spectrum sequence code corresponding to the predetermined communication protocol and the second detection value according to the specific data string and the spread spectrum sequence code corresponding to the predetermined vendor comprises determining a correlation between the specific data string and the spread spectrum sequence code corresponding to the predetermined communication protocol to generate the first detection value; and determining a correlation between the specific data string and the spread spectrum sequence code corresponding to the predetermined vendor to generate the second detection value.

11. The wireless communication method of claim 9, wherein determining, by the second wireless communication device, the first detection value according to the specific data string and the spread spectrum sequence code corresponding to the predetermined communication protocol and the second detection value according to the specific data string and the spread spectrum sequence code corresponding to the predetermined vendor comprises determining a correlation between a first predetermined string and the specific data string to generate the first detection value;

and determining a correlation between a second predetermined string and the specific data string to generate the second detection value, wherein the first predetermined string is generated based on the spread spectrum sequence code corresponding to the predetermined communication protocol, and the second predetermined string is generated based on the spread spectrum sequence code corresponding to the predetermined vendor.

12. The wireless communication method of claim 9, wherein determining, by the second wireless communication device, whether both of the vendor of the first wireless communication device and the vendor of the second wireless communication device are the predetermined vendor comprises:

if the first detection value is lower than the second detection value, determining that both of the vendor of the first wireless communication device and the vendor of the second wireless communication device are the predetermined vendor when the first detection value is lower than the second detection value.

13. The wireless communication method of claim 9, further comprising:

if the string to be transmitted in the physical layer is not the specific data string, modulating the string to be transmitted in the physical layer according to the spread spectrum sequence code corresponding to the predetermined communication protocol when the string to be transmitted in the physical layer is not the specific data string.

14. The wireless communication method of claim 9, wherein the specific data string is at least one string in a preamble of a physical layer convergence procedure header of the packet.

15. The wireless communication method of claim 14, wherein the at least one string is a synchronization code or a start of frame delimiter.

* * * * *